United States Patent
Arnold et al.

(10) Patent No.: US 6,734,629 B2
(45) Date of Patent: May 11, 2004

(54) DISCHARGE VESSEL WITH EXCIMER FILL, AND ASSOCIATED DISCHARGE LAMP

(75) Inventors: Erich Arnold, Mainz (DE); Renate Hirrle, Augsburg (DE); Christina Wille, Augsburg (DE); Hans-Dieter Witzke, Berlin (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 10/207,129

(22) Filed: Jul. 30, 2002

(65) Prior Publication Data

US 2003/0020407 A1 Jan. 30, 2003

(30) Foreign Application Priority Data

Jul. 30, 2001 (DE) .......................... 101 37 015

(51) Int. Cl.[7] .............................. H01J 61/35
(52) U.S. Cl. .................. 313/635; 313/636; 313/485; 313/567
(58) Field of Search ................ 313/636, 635, 313/573, 483, 485, 567

(56) References Cited

U.S. PATENT DOCUMENTS

| 3,821,585 A | * | 6/1974 | Jansson et al. ............. 313/579 |
|---|---|---|---|
| 4,256,988 A |   | 3/1981 | Coaton et al. ............... 313/221 |
| 4,363,998 A | * | 12/1982 | Graff et al. .................. 313/487 |
| 4,544,997 A | * | 10/1985 | Seuter et al. ............... 362/263 |
| 5,218,269 A | * | 6/1993 | Bouchard .................... 313/619 |
| 5,258,689 A | * | 11/1993 | Jansma et al. .............. 313/489 |
| 5,270,615 A |   | 12/1993 | Chang |
| 5,473,226 A | * | 12/1995 | Beschle et al. ............. 313/580 |
| 5,514,932 A |   | 5/1996 | Willibrordus et al. |
| 5,898,265 A |   | 4/1999 | Woodward et al. |

FOREIGN PATENT DOCUMENTS

| CH | 672 380 | 11/1989 |
| EP | 0 639 852 | 2/1995 |
| WO | 01/35442 | 5/2001 |

OTHER PUBLICATIONS

Segner, "Plasma Impulse Chemical Vapor Deposition," *Thin Films for Optical Systems*, 1995, 203–229.

* cited by examiner

*Primary Examiner*—Edward J. Glick
*Assistant Examiner*—Elizabeth Gemmell
(74) *Attorney, Agent, or Firm*—Robert F. Clark

(57) ABSTRACT

A discharge vessel with an excimer fill comprises a cap, electrodes and a fill having at least one noble gas and a halogen, which, when the lamp is operating, together form an excimer, the discharge vessel being manufactured from quartz glass. The inner wall of the discharge vessel is completely covered with a passivation layer of a metal oxide of the metals Al, Hf, Y or Sc or the mixed oxides thereof, the layer having an amorphous structure and its layer thickness being 20 to 200 nm.

9 Claims, 4 Drawing Sheets

DISCHARGE VESSEL WITH EXCIMER FILL, AND ASSOCIATED DISCHARGE LAMP

TECHNICAL FIELD

The invention is based on a discharge vessel having electrodes and a fill which comprises at least one noble gas and a halogen, which, when the lamp is operating, form together an excimer, the discharge vessel being manufactured from quartz glass, and may be used in an associated discharge lamp. This fill is referred to as excimer fill, which in particular includes aggressive fill components, such as above all F or Cl.

BACKGROUND ART

U.S. Pat. No. 5,898,265 has disclosed the use of protective layers in fluorescent lamps, which are applied between the discharge vessel and the phosphor layer, protecting the lamps from becoming gray as a result of Hg bonding to the lamp glass. The layers are predominantly applied by using suspensions of crystalline particles, in particular of $Al_2O_3$, in the nanometer range. AlonC is generally used, which is crystalline, extremely finely dispersed $\gamma$-$Al_2O_3$ with a mean grain diameter of approx. 10 nm. Mixed layers comprising $\gamma$-$Al_2O_3$ and $\alpha$-$Al_2O_3$ are also described, providing further advantages for the same application, cf. U.S. Pat. No. 5,514,932. The layers used are exclusively crystalline, are applied via a suspension and have layer thicknesses in the micrometer range.

The same principle is also used for Hg UV radiators. CH-A 672 380 describes a diffusion barrier layer comprising oxide of Al Hf, La, Th for Hg in UV radiators which use a fill comprising Hg (1 mbar) and Ar (0.7 mbar) and the discharge vessel of which, which is made from quartz glass, is subject to little load: in operation, the wall temperature is approximately 200° C. In this case too, the blackening of the bulb is to be reduced. Layer thicknesses of the barrier layer of from 10 to 1000 nm are used. The layers are applied by means of dip coating with the aid of organic or inorganic precursors. The drainage rate selected for the coating solution is 50–80 cm/min., from which a high layer thickness can be inferred. In the case of $Al_2O_3$, the heat treatment took place at 600° C. For $HfO_2$, an improvement in transmission over the service life (3000 hours) was detected.

U.S. Pat. No. 5,270,615 describes protective layers which in metal halide high-pressure discharge lamps are to act as a diffusion barrier preventing the metal halides from attacking the quartz glass discharge vessel. Multiple layers comprising oxides of Ta or Nb and comprising $Al_2O_3$ are applied in order to gradually match the thermal expansion.

DISCLOSURE OF THE INVENTION

It is an object of the present invention to provide a discharge vessel being manufactured from quartz glass, and having an excimer fill, the vessel having electrodes and a fill which comprises at least one noble gas and a halogen, which, when the lamp is operating, form together an excimer, which is distinguished by a high service life, even though it uses highly aggressive filling substances. a further object is to provide an associated lamp with such a vessel.

This object is achieved by the inner wall of the discharge vessel being completely covered with a passivation layer of an oxide formed from at least one of the metals Al, Hf, Y or Sc, the layer having an amorphous structure and its total layer thickness being 20 to 500 nm. Particularly advantageous configurations are to be found in the dependent claims.

Hitherto, the halogen fluorine, as a highly aggressive filling component, was not useable in glass vessels. This also applies to a lesser extent to chlorine.

Quartz glass as a preferred material for the discharge vessel of lamps is subject to limits on account of reactions with aggressive filling components, such as fluorine, chlorine and, to a lesser degree, for bromine, iodine. Therefore, hitherto long-life excimer lamps were only possible with the filling system $Xe_2^+$, which emits at 172 nm. New filling systems for excimer lamps (e.g. XeCl: $\lambda$=308 nm; KrCl: $\lambda$=222 nm; XeF: $\lambda$=351 nm; KrF: $\lambda$=248 nm; ArF: $\lambda$=193 nm) are of considerable interest on account of the further discrete UV wavelengths which are used for various technical processes. Existing chloride-containing systems are not optimally attuned.

A typical cold filling pressure for the entire fill of these excimer radiators is 20 to 400 mbar, the partial pressure of the halogen compound typically forming between 1 and 10% of the total filling pressure.

Fluorine, as a particularly aggressive fill medium, has not hitherto been used in excimer radiators in quartz glass vessels. The fluorine atoms and ions which are formed in the discharge react immediately with the quartz glass, to form silicon fluoride and oxygen. This consumption of fluorine means that less fluorine is available for the discharge, fewer noble-gas excimers are able to form and within seconds it is no longer possible to detect the specific excimer radiation (at 351 nm for XeF*). In order nevertheless to allow discharge lamps to be operated with fill components of this type, it is necessary to discover a cladding material which withstands such an attack. The same applies to a lesser extent to chlorine.

The use of polycrystalline aluminum oxide (PCA) for the discharge vessel, which naturally behaves passively with respect to the fluorine-containing fill, inherently represents one solution. However, the use of a ceramic of this type entails various drawbacks. For example, the vacuum-tight closure and the shaping are very much more complex and expensive than with quartz glass.

Passivation of the quartz glass with an amorphous, transparent $Al_2O_3$ protective layer which is from to 20 to 500 nm (preferably at most 200 nm) thick allows the well-controlled quartz glass technology to be retained. Moreover, the optical advantages of quartz glass over ceramic can be utilized. The passivation has to take place over the entire surface of the discharge vessel which interacts with the discharge.

It was not hitherto possible to make commercial use of excimer lamps with fluoride components having a discharge vessel made from quartz glass. The discrete UV wavelengths which in particular fluoride-containing radiators emit were therefore not hitherto available for excimer lamps.

Now, an essential feature is that the layer is amorphous. This amorphous layer leads to an enormous increase in the service life of the lamp, which for the first time ever allows industrial utilization of fluorine excimers. The service life is at least 100 hours and, depending on the particular design, may even exceed 1000 hours. On the other hand, amazingly, it was impossible to detect any barrier action with crystalline layers made from the same material.

The application of suitable layers comprising amorphous $Al_2O_3$ results in passivation of the surface of the quartz glass vessel with respect to species which occur in the plasma. In addition to $Al_2O_3$, oxides of Hf, Y or Sc or mixed oxides thereof have also proven to be suitable coating materials.

A basic demand imposed on the layer is that the inner surface of the discharge vessel be completely covered, in order to prevent any reactions whatsoever between the quartz glass and the fill. Accordingly, the layer must not have any cracks or open pores. To ensure that is achieved with even greater reliability, it is recommended to apply a second layer (or further layers) of the same material.

The layer is produced using the sol-gel process or alternatively using a CVD process. Details of a CVD process which is suitable for internal coatings are to be found, for example, in the following article: Segner, J.: Plasma Impulse Chemical Vapor Deposition. In: Thin films for optical systems ed. by F. R. Flory, New York (inter alia Dekker, 1995, pp. 203–229).

With the aid of the sol-gel process, it is possible without major outlay, using modified dip coating, to completely coat the inner surface of the discharge vessel. The precursor used is an organic sol based on metal alkoxide, in particular aluminum alkoxide. The rate at which the sol drains out determines the layer thickness and the quality of the layer and must therefore be controllable. To produce crack-free layers, drainage rates in the range from 4–10 cm/min. are preferred. At higher rates, there is an increased risk of cracks forming. With the sol technique, a maximum of approximately 20 cm/min. can be tolerated, but the maximum value is dependent on the sol which is used. The coating operation is followed by a drying operation which causes the wet film to be transformed into a gel film. This gel film is converted into metal oxide ($Al_2O_3$) by a heat treatment in a furnace with dissociation of organic components. It has been found that only layers which have been heat-treated at temperatures of 400 to 850° C., preferably 500–800° C., have a barrier action with respect to fluorine components and a considerable improvement in the barrier action with respect to other halogens. X-ray tests have demonstrated that the layers (or powders) which have been treated at these temperatures were X-ray amorphous. Crystalline transition aluminum oxides ($\gamma$, $\delta$ and $\theta$ phases) are only formed at temperatures over 850° C., and the thermodynamically stable $\alpha$-$Al_2O_3$ is only formed at above approximately 1100° C. All the layers in which these crystalline phases were detected did not have any barrier effect with respect to the fluorine-containing fill and only a weak barrier effect with respect to other halogens.

The $Al_2O_3$ layers which were treated at temperatures of 400 to 850° C., preferably at 500–800° C., appear to be structure free. The particles in the layer are typically of nanometer size. The layers are crack-free and pore-free. The total layer thickness is approximately 20 to 500 nm.

In the case of individual layers, the layer thickness is preferably between 50 and 100 nm.

Layer systems comprising two to five layers are advantageous in order to compensate for any coating flaws and to minimize defects. Often even a double coating is sufficient to hermetically passivate the surface.

BRIEF DESCRIPTION OF THE DRAWINGS

The invention is to be explained in more detail below with reference to a number of exemplary embodiments. In the drawings.

BEST MODE FOR CARRYING OUT THE INVENTION

Figure 1:
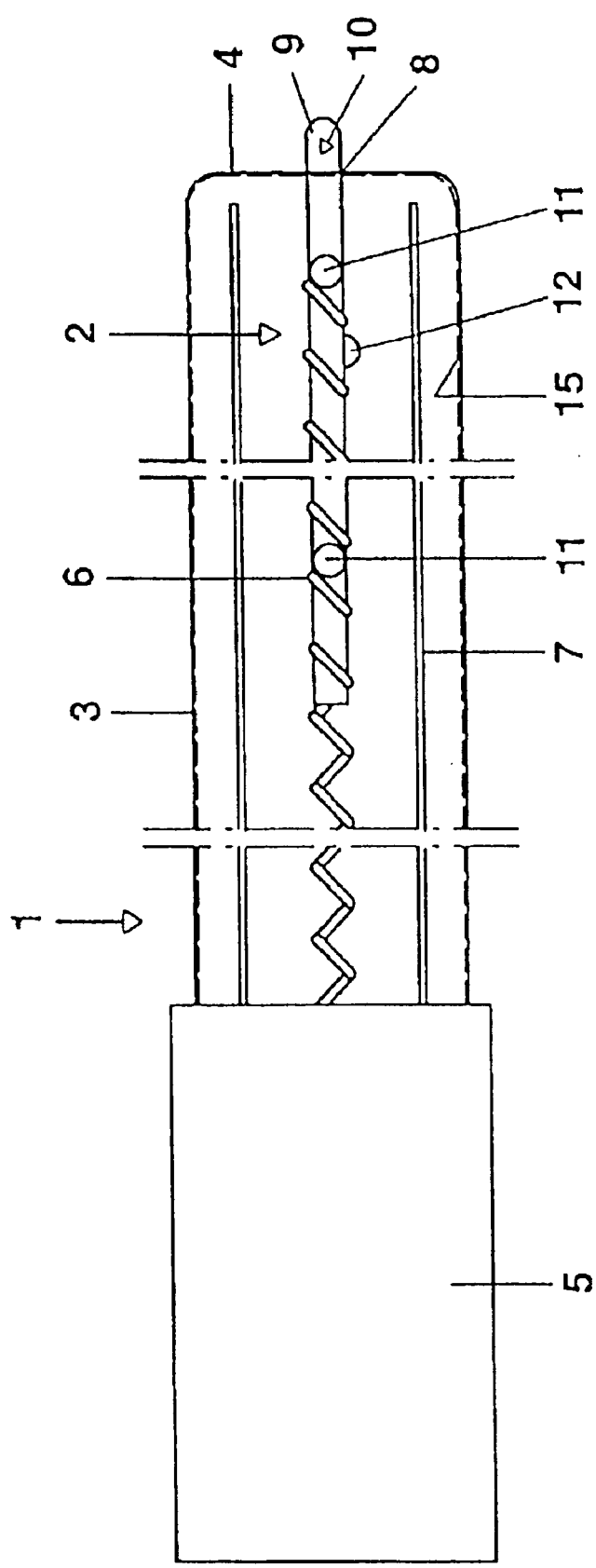
FIG. 1 shows a discharge lamp with passivation layer.

Excimer radiators are used as UV/VUV radiators for surface and wafer cleaning, ozone production and for cleaning purposes. A lamp of this type is described, for example, in WO-A 01/35442. In principle, as shown in FIG. 1, this is a lamp 1 which has a discharge volume 2 in a discharge vessel 3 made from quartz glass. It is held by a cap 5 on one side. A cathode 6 in filament form is arranged centrally in the discharge vessel. On the outer side of the discharge vessel there are a plurality of anodes 7 in strip form. As holder 10, the lamp has an axial support tube 9 which projects into the discharge volume from an end wall 4. Lugs 11, 12 hold the cathode 6. The inner wall of the discharge vessel is completely covered with a passivation layer 15 of $Al_2O_3$. It is designed as a double layer. The total thickness of the layer is approximately 200 nm.

Figure 2:
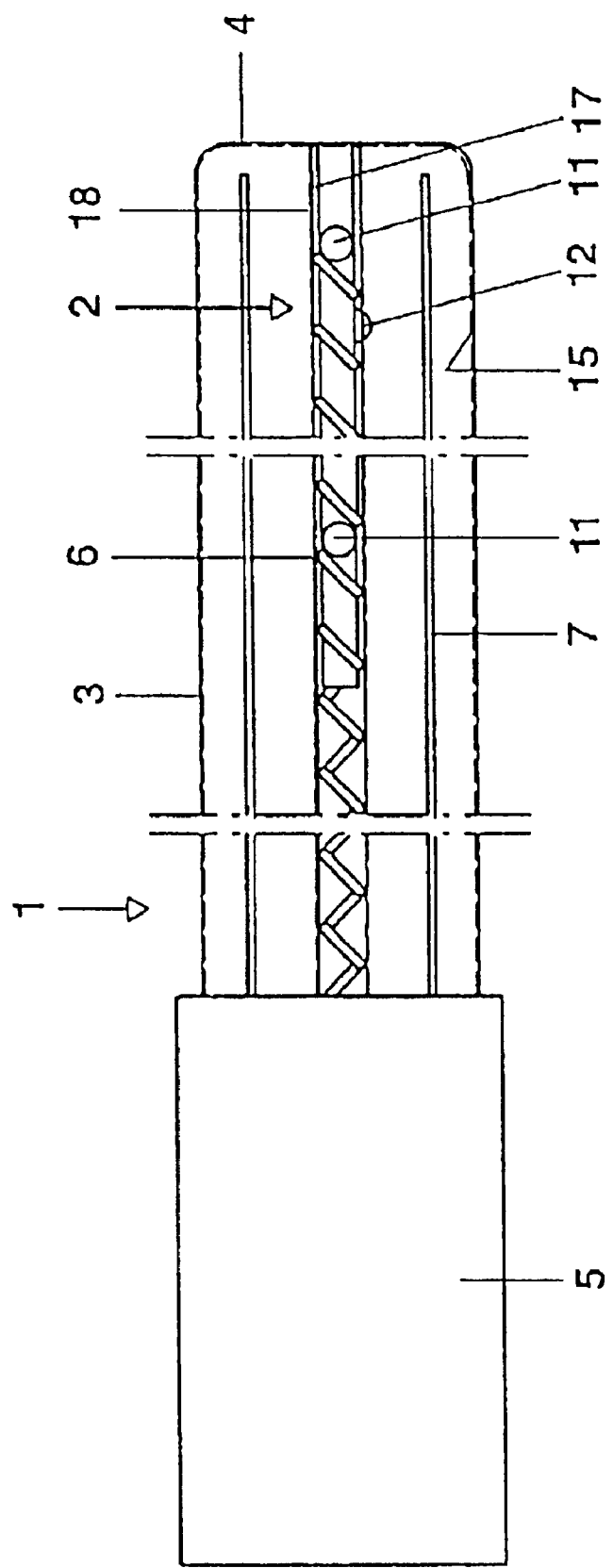
FIG. 2 shows a further exemplary embodiment of a discharge lamp with passivation layer.

A further preferred embodiment is illustrated in FIG. 2. Similar features in this figure have the same reference numerals as those used in FIG. 1. This is a lamp with a dielectric barrier discharge on both sides. This means that the inner electrode is also additionally surrounded by a dielectric cladding 17 in tube form, which hermetically seals the inner electrode from the discharge volume. The surface of this cladding 17 is protected from the discharge volume by a passivation layer 18. The pump connection piece is in this case fitted on the cap side toward the discharge volume (not visible). In this way, the inner electrode is also protected from the aggressive fill, with the result that the service life increases.

Tubular quartz glass bulbs are used as discharge vessel for the excimer radiators. Typical dimensions are 20 mm diameter and approx. 20 cm length. Since the discharge takes place in the interior of the lamp, the tube is internally coated. The layer of $Al_2O_3$ advantageously has a thickness of 100 to 250 nm.

The layer is produced using the sol-gel process in accordance with the following steps:

To clean and activate the surface, the tubes are pretreated prior to the coating. The internal coating of the tubes takes place by means of a modified dip coating, by filling the tube and then allowing the coating solution to drain out. Since the drainage rate is a crucial parameter for the layer thickness and the layer quality, it must be set reproducibly. Crack-free layers were produced with drainage rates of 4–20 cm/min., preferably at most 10 cm/min. The lower the drainage rate selected, the thinner the layer becomes (based on the use of the same sol).

The coating is followed by drying of the layer using infrared radiators and a heat treatment in the furnace (at approximately 600° C.). During the furnace treatment, the gel layer is converted into $Al_2O_3$ with dissociation of organic constituents. The tubes were coated twice. After the second coating, the tubes were typically heat treated for 1 h at 500 to 800° C.

The coated discharge vessels were closed at one end. A pump tube was fitted to the second end. The tubes were evacuated and at the same time heated to approx. 450° C. with the aid of a tubular furnace, in order to eliminate adsorbed water. Then, the discharge vessel was filled with fluorine and xenon (1 mbar of $SF_6$ and 30 mbar of xenon are typical), in order to form XeF*. The excitation of the plasma was effected by means of two spiral electrodes which were arranged at the outer surface of the discharge vessel, at a distance of 30 mm from one another, and to which a high-frequency AC voltage was applied. The power introduced was 20 W. The plasma which forms between and below the two electrodes emits radiation with a wavelength of 351 nm (UV-A radiation region). The following reactions take place in the interior of the lamp:

$$SF_6 + e^- \rightarrow SF_5^- + F$$

$$Xe_{2^*+F_2} \rightarrow XeF^* + Xe + F$$

$$Xe_2^* + F^- + M \rightarrow XeF^* + Xe + M$$

$$XeF^* \rightarrow Xe + F + \nu(351\ nm)$$

The radiation was recorded using a spectrometer. The strength of the UV-A signal correlates to the fluorine concentration in the plasma. For comparison purposes, the tests were also carried out on uncoated discharge vessels, using constant conditions.

Figure 3:
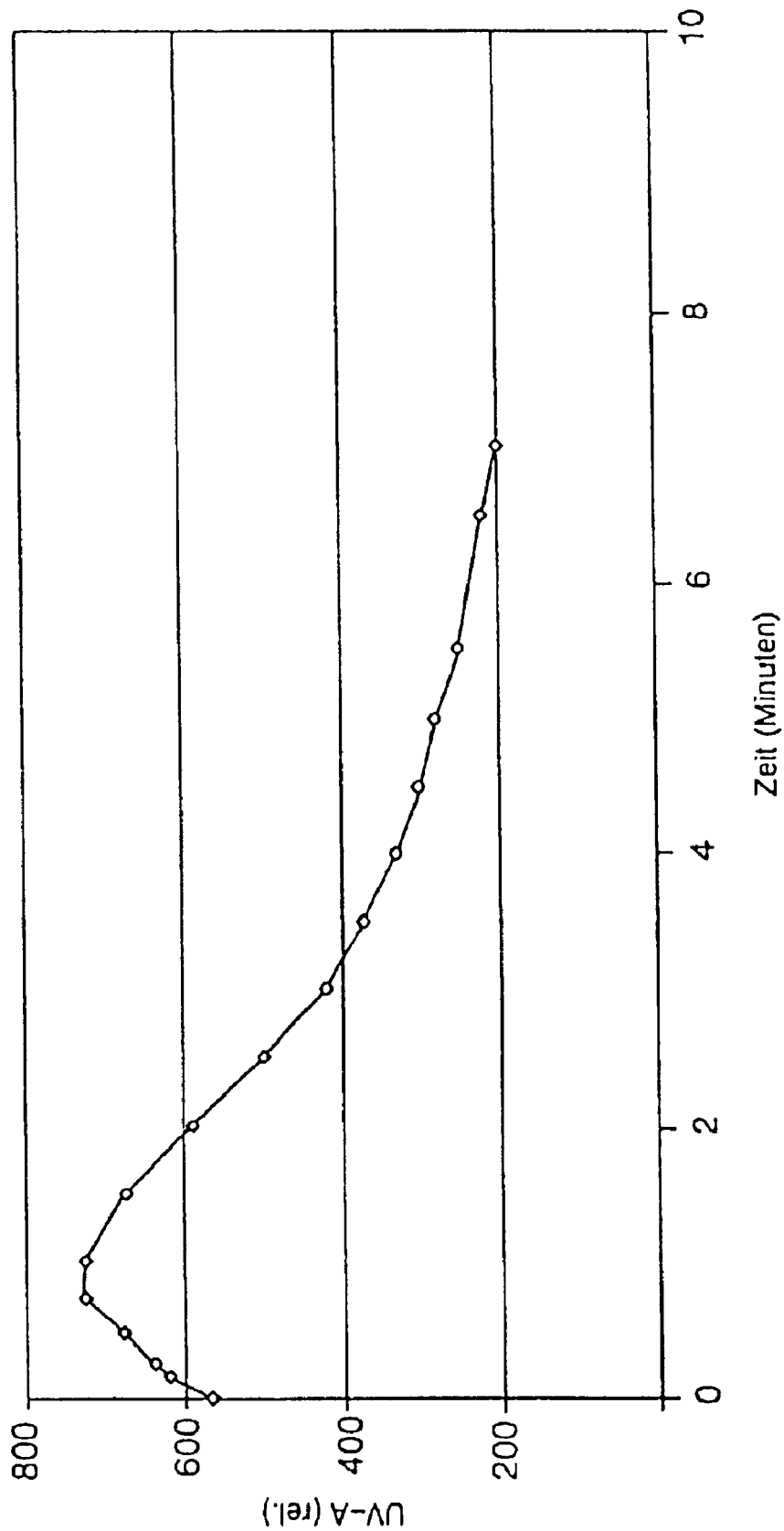
FIG. 3 shows the time curve of the excimer radiation in an uncoated discharge vessel.
Figure 4:
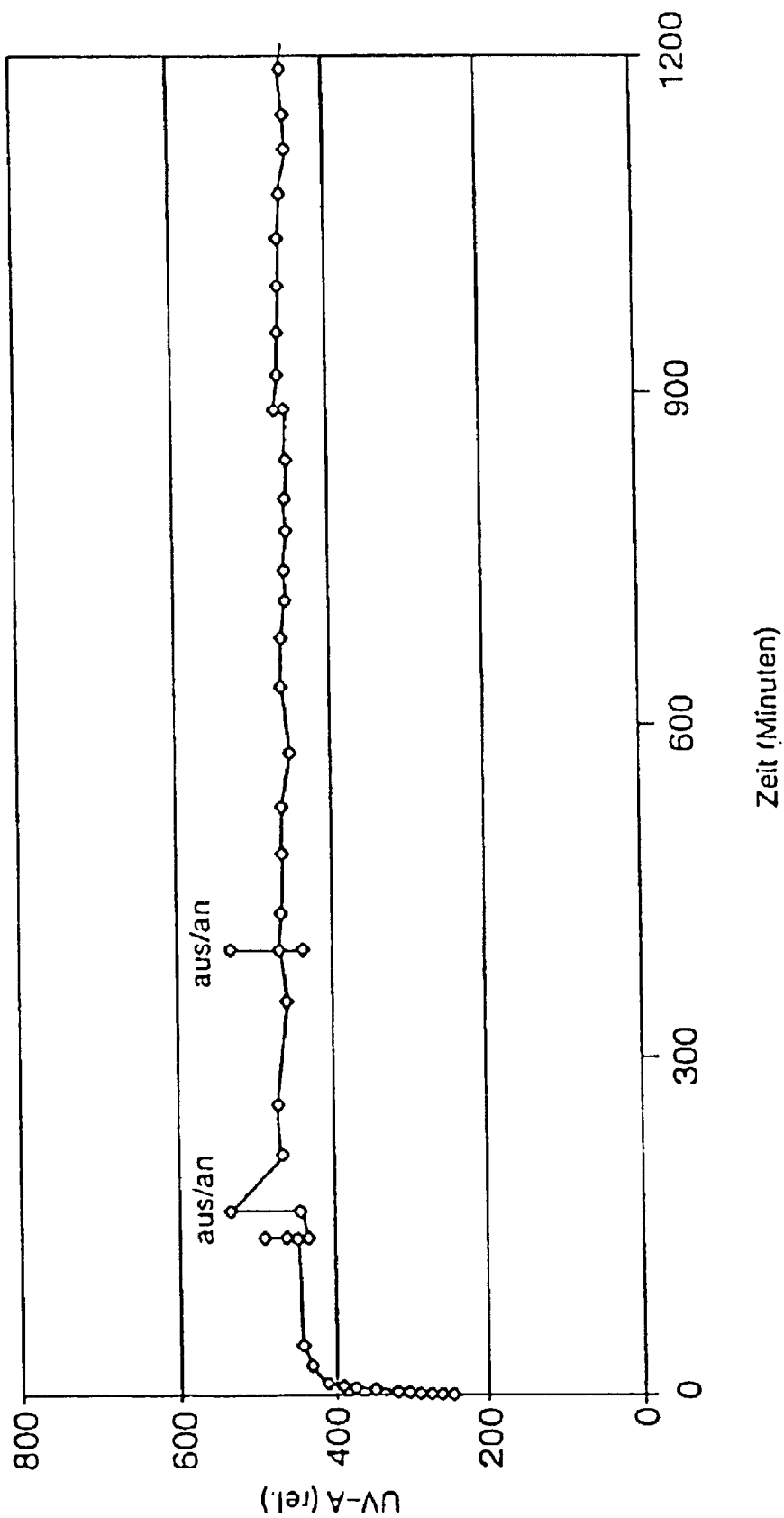
FIG. 4 shows the time curve of the excimer radiation in a coated discharge vessel.

FIGS. 3 and 4 show the time curve of the XeF* excimer radiation for an uncoated discharge vessel (FIG. 3) and a coated discharge vessel (FIG. 4). After the discharge has started, XeF* is formed, and after a few seconds the specific radiation at 351 nm can be detected. In the case of the uncoated discharge vessel (FIG. 3), after just a short time the radiation signal merges into saturation and then drops within a few seconds, which is attributable to the consumption of fluorine species on account of wall reactions with the quartz glass.

FIG. 4 shows the time curve of the XeF* excimer radiation with a discharge vessel which has been coated twice and then heat treated at 600° C. After a few minutes, the UV-A signal merges into saturation and remains constant for many hours. Overall, the service life is lengthened by a factor of at least 1000 compared to uncoated lamps. The layer leads to passivation of the quartz glass surface with respect to the reactive species from the plasma.

This exemplary embodiment demonstrates the ability of the thin $Al_2O_3$ film to function as a passivation layer for quartz-glass vessels with respect to aggressive lamp filling substances. Passivation layers comprising oxides of Hf, Y or Sc or corresponding mixed oxides behave in a similar way.

Further tests have demonstrated that the heat treatment of the layers is a crucial parameter for the passivation properties. Only layers which have been heat treated at temperatures of 400–850° C. have the passivating effect. This effect is particularly pronounced at temperatures of 500 to 800° C.

Finally, it has been shown that when an individual layer is compared with a double layer, the individual layer provides less good results even with the same total layer thickness, since production can be controlled less successfully than with a double layer. Therefore, layer thicknesses of 150 nm and above should preferably be produced as multiple layers.

Multiple coatings are in principle applied in accordance with the individual steps used for a single layer, although without the detailed process parameters having to coincide.

What is claimed is:

1. A discharge vessel having electrodes and a fill which comprises at least one noble gas and a halogen, which when the lamp is operating together form an excimer, the discharge vessel being manufactured from quartz glass, wherein the inner wall of the discharge vessel is completely covered with a passivation layer of an oxide formed from at least one of the metals Al, Hf, Y or Sc, the layer having an amorphous structure and its total layer thickness being 20 to 500 nm.

2. The discharge vessel as claimed in claim 1, wherein the layer thickness is 100 to 200 nm.

3. The discharge vessel as claimed in claim 1, wherein a system comprising two to five layers is used.

4. The discharge vessel as claimed in claim 1, wherein the halogen is chlorine or fluorine.

5. The discharge vessel as claimed in claim 1, wherein at least one electrode is located inside the discharge vessel, and this electrode is protected from the discharge volume by a glass cladding, the discharge-side surface of the cladding likewise being protected by a passivation layer.

6. The discharge vessel as claimed in claim 1, wherein the layer is produced using the sol-gel process or a CVD process.

7. A discharge lamp having the discharge vessel as claimed in claim 1.

8. A process for producing the discharge vessel as claimed in claim 1 by means of a sol-gel process, with the following process steps:

a) providing and cleaning a quartz-glass tube;

b) immersing or filling the tube in a coating solution which contains an organic sol with a metal alkoxide precursor;

c) allowing the solution to drain out at a rate of 4 to 20 cm/min, during which process the wet film is converted into a gel film;

d) heat treatment of the gel film at a temperature of 400 to 850° C., with the result that an amorphous layer of the metal oxide is formed.

9. The process as claimed in claim 8, wherein a multiple layer is produced by repeating the process steps described in claim 8.

* * * * *